United States Patent
Wang et al.

(10) Patent No.: US 8,091,180 B2
(45) Date of Patent: Jan. 10, 2012

(54) HINGE ASSEMBLY

(75) Inventors: Jin-Xin Wang, Shenzhen (CN);
Lian-Cheng Huang, Shenzhen (CN);
Li-Jun Yuan, Shenzhen (CN)

(73) Assignees: Hong Fu Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 423 days.

(21) Appl. No.: 12/488,726

(22) Filed: Jun. 22, 2009

(65) Prior Publication Data

US 2010/0263166 A1 Oct. 21, 2010

(30) Foreign Application Priority Data

Apr. 21, 2009 (CN) .......................... 2009 1 0301721

(51) Int. Cl.
*E05D 3/10* (2006.01)

(52) U.S. Cl. .......................................... 16/367; 16/348
(58) Field of Classification Search ............... 16/367, 16/302, 374, 297, 337, 342, 348, 357; 361/679.27, 361/679.07; 455/575.3; 379/433.13; 248/923
See application file for complete search history.

(56) References Cited

U.S. PATENT DOCUMENTS

| | | | |
|---|---|---|---|
| 7,024,729 B2* | 4/2006 | Chang et al. .................... | 16/367 |
| 7,299,526 B2* | 11/2007 | Kim ................................ | 16/367 |
| 7,600,298 B2* | 10/2009 | Chen et al. ..................... | 16/367 |
| 7,716,788 B2* | 5/2010 | Lin ................................. | 16/330 |
| 7,725,989 B2* | 6/2010 | Huang et al. ................... | 16/367 |
| 7,743,468 B2* | 6/2010 | Chang et al. .................... | 16/374 |
| 7,832,058 B2* | 11/2010 | Wang et al. ..................... | 16/367 |
| 7,954,203 B2* | 6/2011 | Chen et al. ..................... | 16/367 |
| 7,971,321 B2* | 7/2011 | Chen et al. ..................... | 16/367 |
| 8,002,227 B2* | 8/2011 | Garcia et al. ............... | 248/278.1 |
| 2007/0169315 A1* | 7/2007 | Lu et al. ......................... | 16/367 |
| 2007/0169316 A1* | 7/2007 | Lu et al. ......................... | 16/367 |

* cited by examiner

*Primary Examiner* — William L. Miller
(74) *Attorney, Agent, or Firm* — Altis Law Group, Inc.

(57) ABSTRACT

A hinge assembly includes a first connecting member, a second connecting member, a rotary member, an elastic member, and a limiting member. The rotary member includes a first pivot portion to engage with the first connecting member and a second pivot portion to engage with the second connecting member. The elastic member is disposed between the second connecting member and the rotary member. The limiting member is positioned on the second connecting member. A sidewall of one of the second pivot portion of the rotary member and the second connecting member defines a limiting structure. The limiting member is disposed on a sidewall of the other one of the second pivot portion of the rotary member and the second connecting member. The limiting member slidably engages with the limiting structure.

15 Claims, 4 Drawing Sheets

HINGE ASSEMBLY

BACKGROUND

1. Technical Field

The present disclosure generally relates to hinge assemblies and, particularly, to a hinge assembly for electronic devices.

2. Description of Related Art

Electronic devices such as mobile phones, personal digital assistants (PDAs), notebooks, and desktop computers with a display device are in widespread use, and consumers may now enjoy the full convenience of high technology products almost anytime and anywhere. Nowadays, consumers desire a first body of the electronic device not only be opened by rotating about a first direction, but also rotate about a second direction, relative to a second body.

A typical dual-directional hinge assembly often includes two subassemblies. Each subassembly includes a shaft, a pair of cams, a spring, a plurality of washers, and a housing. The shaft and one of the cams are rotatable relative to the housing and the other one of the cams. The cams have cam surfaces to engage with each other. However, the hinge assembly has many components and a complex structure. Thus, the hinge assembly is difficult to manufacture and assemble.

Therefore, a new hinge assembly is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTIONS

Figure 1:
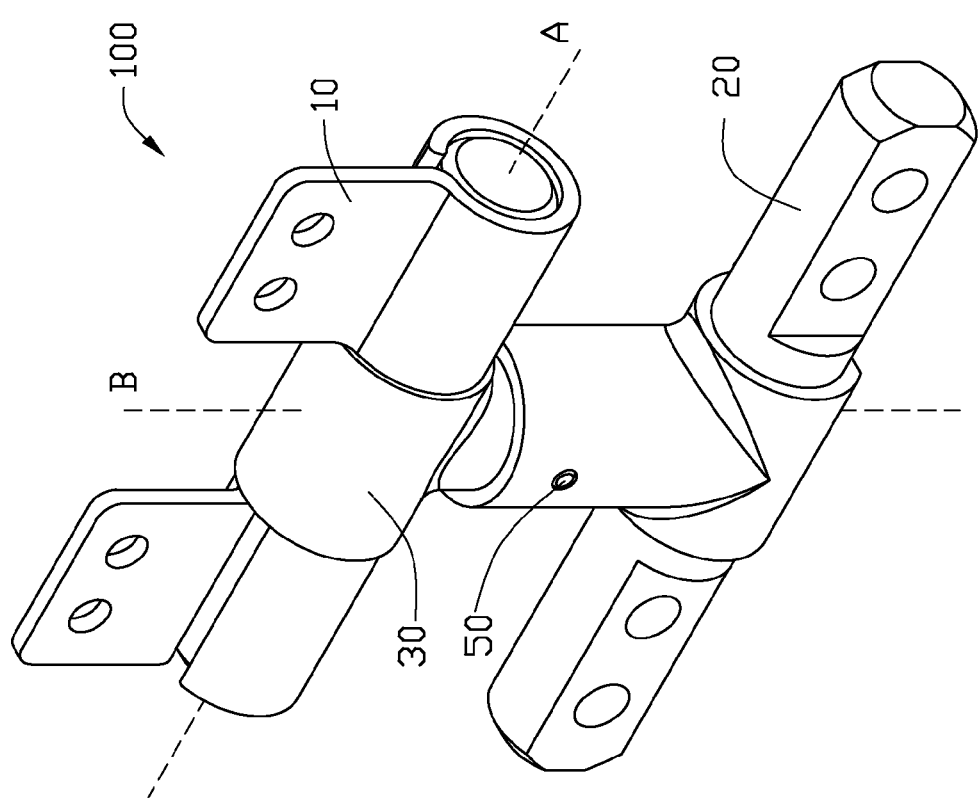
FIG. 1 is an assembled, perspective view of an embodiment of a hinge assembly, the hinge assembly including a rotary member.
Figure 2:
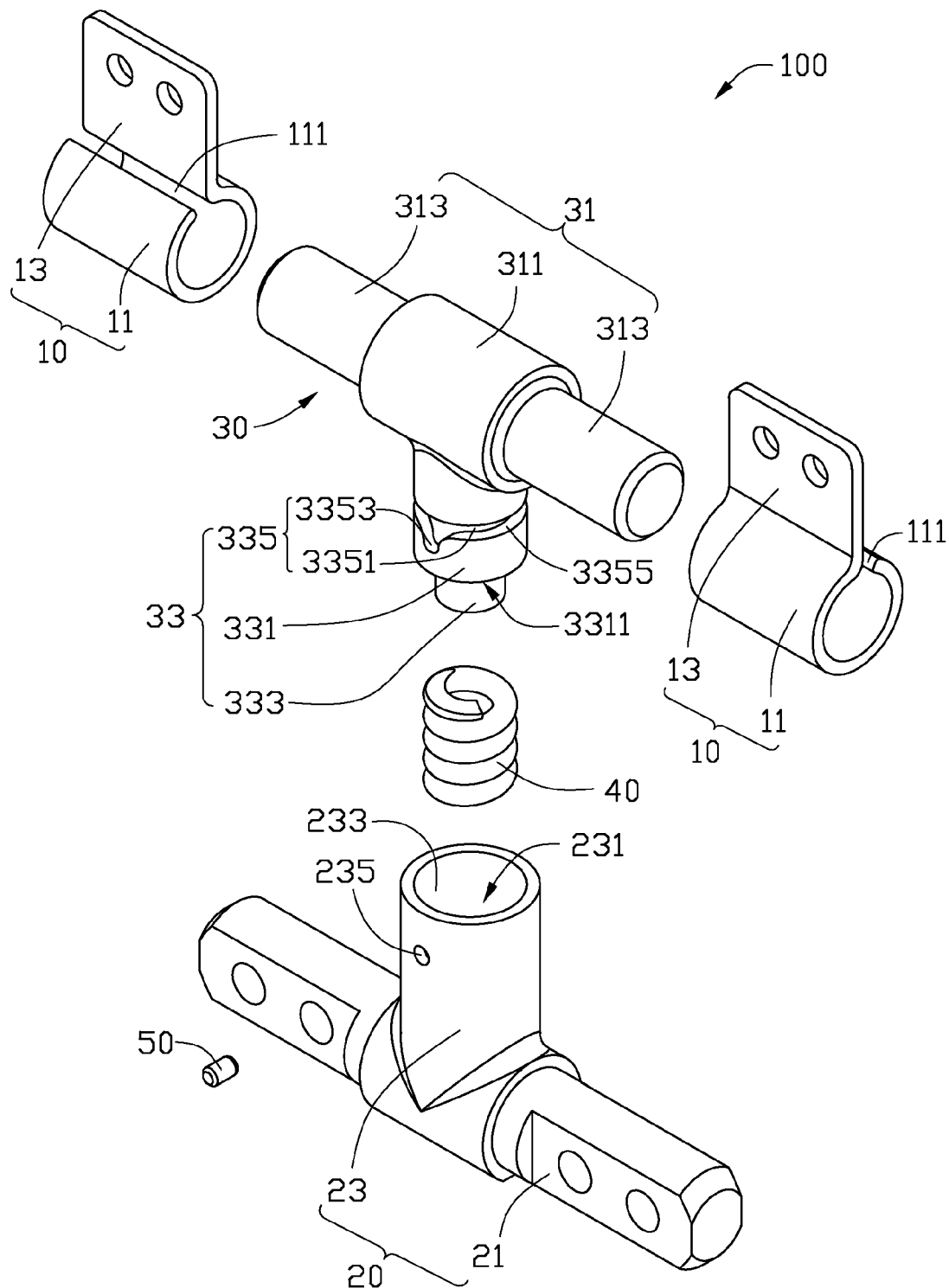
FIG. 2 is an exploded, perspective view of the hinge assembly of FIG. 1.

Referring to FIG. 1 and FIG. 2, an embodiment of a hinge assembly 100 includes two first connecting members 10, a second connecting member 20, a rotary member 30 pivotally connected to the first and second connecting members 10, 20, an elastic member 40 disposed between the second connecting member 20 and the rotary member 30, and a limiting member 50 positioned on the second connecting member 20.

The first connecting member 10 includes a knuckle 11 and a connecting portion 13. The knuckle 11 extends from an end of the connecting portion 13 forming a loop. The knuckle 11 defines an opening 111 at a sidewall, thus having a C-shaped cross-section. When the hinge assembly 100 has been assembled, the first connecting members 10 coil along opposite directions on the rotary member 30.

The second connecting member 20 is T-shaped. The second connecting member 20 includes a connecting shaft 21 and a housing 23 formed from a side of a middle portion of the connecting shaft 21. The housing 23 defines a cavity 231 and includes a sidewall 233 enclosing the cavity 231. The sidewall 233 defines a pinhole 235 communicating with the cavity 231 in a cylindrical surface of the housing 23.

Figure 4:
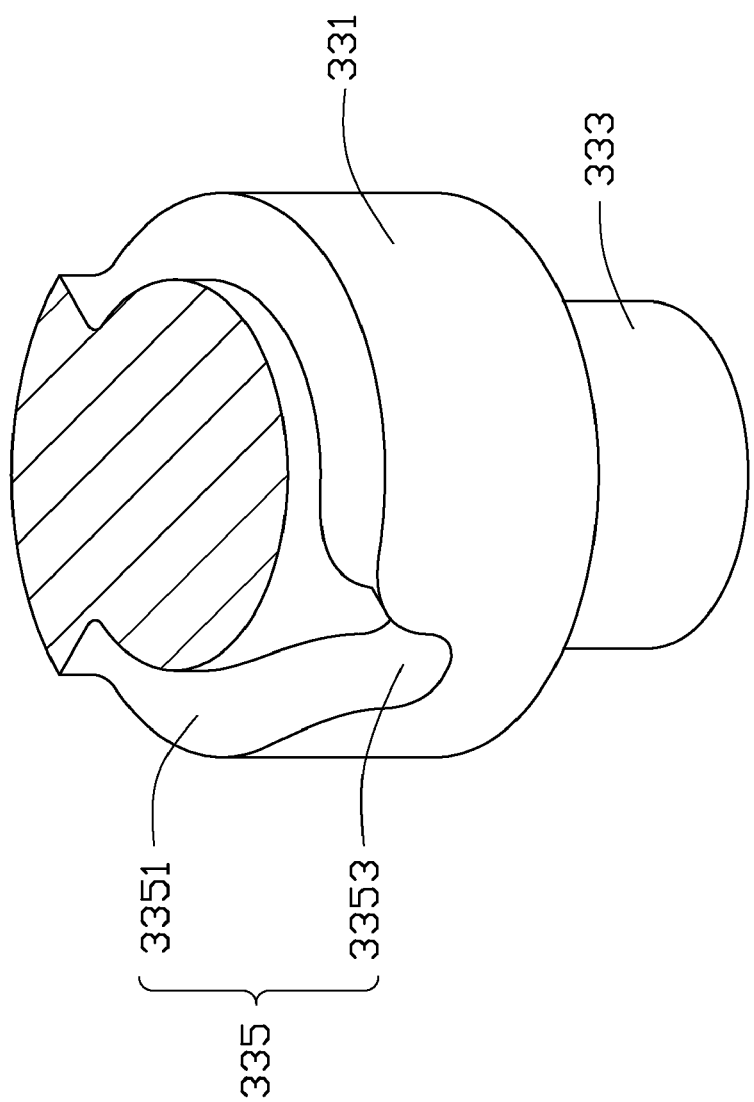
FIG. 4 is cut-away view of the rotary member of the hinge assembly of FIG. 2.

The rotary member 30 is T-shaped and includes a first pivot portion 31 and a second pivot portion 33 substantially perpendicularly formed from a middle of the first pivot portion 31. The first pivot portion 31 and the second pivot portion 33 are substantially cylindrical shafts. The first pivot portion 31 includes a first shaft 311 and two second shafts 313 formed at opposite ends of the first shaft 311. The first shaft 311 has a diameter larger than diameters of the second shafts 313. The first connecting members 10 are rotatably sleeved on the second shafts 313 correspondingly. The second pivot portion 33 extends from a sidewall of the first shaft 311. The second pivot portion 33 includes a main shaft 331, a guiding shaft 333, and a limiting structure 335. The guiding shaft 333 has a diameter smaller than a diameter of the main shaft 331. A step surface 3311 is defined at a joining position of the main shaft 331 and the guiding shaft 333. The limiting structure 335 is defined in a sidewall of the main portion 331 and includes a ring-shaped limiting slot 3351 and a positioning slot 3353 communicating with the limiting slot 3351. That is, the limiting structure 335 is defined in a cylindrical surface of the main portion 331. The limiting slot 3351 extends along a circumference of the main shaft 331 and the positioning slot 3353 extends along a line parallel to the axis B of the main shaft 331 towards the guiding shaft 333. The limiting structure 335 includes a curved resisting surface 3355. Referring to FIG. 4, in the illustrated embodiment, the limiting slot 3351 extends about 270 degrees. The positioning slot 3353 is positioned to partition the limiting slot 3351 into two parts extending through 90 degrees and 180 degrees correspondingly. Alternatively, the positioning slot 3353 may be positioned in other positions and more positioning slots 3353 may be defined according to different requirements.

The elastic member 40 is received in the cavity 231 of the housing 23 with two ends of the elastic member 40 resisting the step surface 3311 and a bottom surface (not shown) of the cavity 231. Part of the elastic member 40 is sleeved on the guiding shaft 333. In the illustrated embodiment, the elastic member 40 is a column, helical, compression spring.

The limiting member 50 is a pin. The limiting member 50 extends through the pinhole 235 and in the limiting slot 3351 and the positioning slot 3353. Alternatively, the limiting member 50 may be replaced by a protrusion formed on an inner wall of the housing 23.

Figure 3:
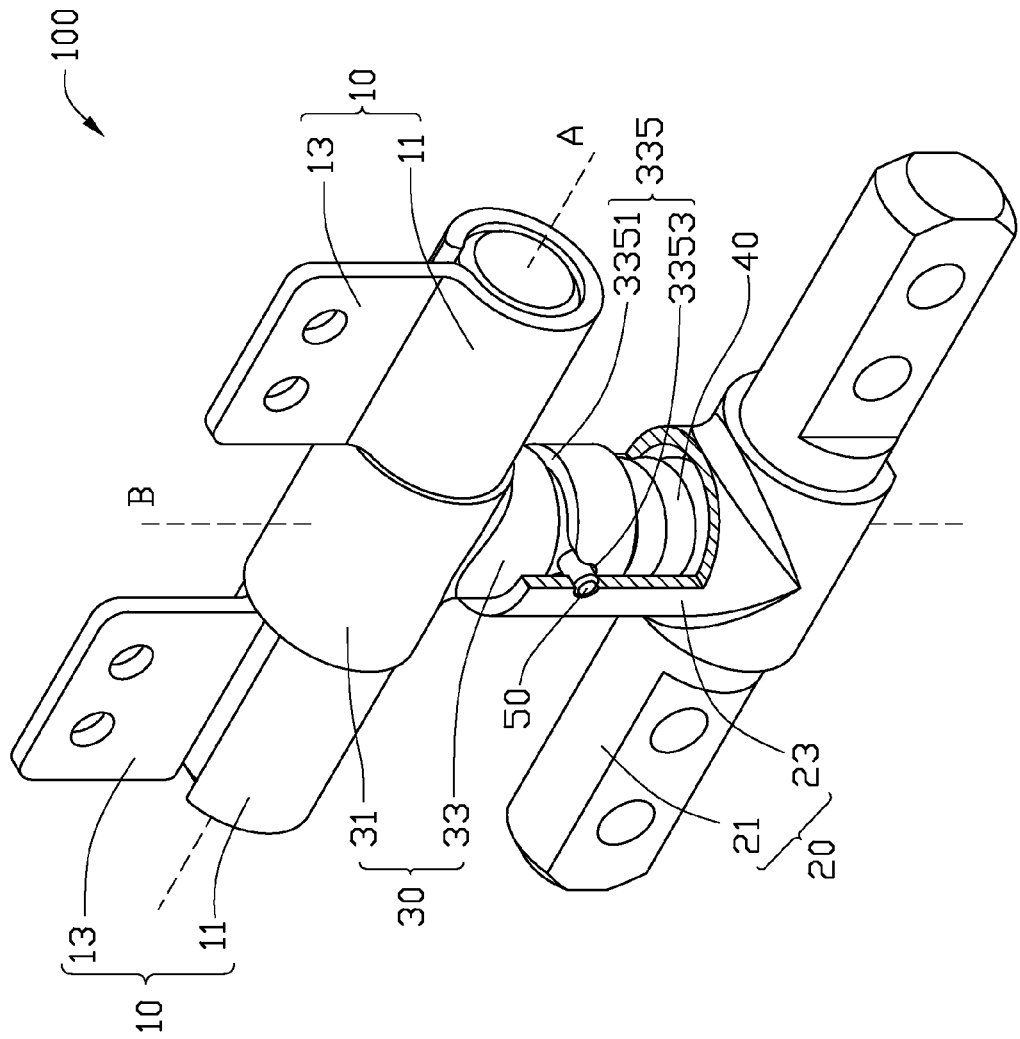
FIG. 3 is a partial cut-away view of the hinge assembly of FIG. 1.

Referring to FIG. 2 and FIG. 3, to assemble the hinge assembly 100, the first connecting members 10 are sleeved on the second shafts 313 of the rotary member 30. The elastic member 40 is received in the cavity 231. The second pivot portion 33 of the rotary member 30 is received in the cavity 231 with part of the elastic member 40 sleeved on the guiding shaft 333. The rotary member 30 is pressed to align the pinhole 235 with the limiting slot 3351 or the positioning slot 3353. The limiting member 50 is positioned in the pinhole 235 and the limiting structure 335. The rotary member 30 is released, thus assembling the hinge assembly 100 as a whole. When the first pivot portion 31 is substantially parallel to the second connecting member 20, the limiting member 50 is in the positioning slot 3353 and the elastic member 40 is free or compressed at a minimum.

In use, the first connecting members 10 are rotatable relative to the second connecting member 20 and the rotary member 30 around a first axis, i.e., the A-axis of FIG. 1. The first connecting members 10 and the rotary member 30 are rotatable relative to the second connecting member 20 around a second axis, i.e., the B-axis of FIG. 1. When the limiting member 50 engages in the limiting slot 3351, the elastic member 40 is further compressed, thus forcing the limiting member 50 to resist the resisting surface 3355 in the limiting slot 3351. Therefore, a friction is generated between the limiting member 50 and the second pivot shaft 33 of the rotary member 30 to maintain the rotary member 30 in any position relative to the second connecting member 20. As the rotary member 30 rotates relative to the second connecting member 20, when the limiting member 50 rotates to an edge of the positioning slot 3353, the elastic force of the compressed elastic member 40 forces the rotary member 30 to slide relative to the second connecting member 20 until the limiting member 50 slides into the positioning slot 3353. When the hinge assembly 100 is operated, the limiting member 50 can be clearly felt when it engages in the positioning slot 3353 and the first connecting members 10 and the rotary member 30 are positioned in a predetermined position relative to the second connecting member 20.

The hinge assembly 100 includes a few components and can rotate in two directions. The hinge assembly 100 is simple in structure and has a low cost. In addition, with only a small number of components, the hinge assembly 100 is easy to assemble.

In alternative embodiments, the guiding shaft 333 of the second connecting member 20 may be omitted. Also, the limiting member 50 may be positioned on the second pivot shaft 33 of the rotary member 30 and the limiting structure 335 may be defined in the housing 23 of the second connecting member 20. The hinge assembly 100 may include a single first connecting member 10. The limiting structure 335 may be a protrusion formed on the sidewall of the second pivot shaft 33, in which the protrusion includes a resisting surface having the same shape as the curved resisting surface 3355 in the limiting slot 3351 and the positioning slot 3353, which resists the limiting member 50.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising:
   a first connecting member;
   a second connecting member;
   a rotary member pivotally connected to the first and second connecting members, the rotary member comprising a first pivot portion to engage with the first connecting member and a second pivot portion to engage with the second connecting member, wherein the first connecting member is rotatable around a first axis relative to the rotary member and the second connecting member, and the first connecting member and the rotary member are rotatable around a second axis relative to the second connecting member;
   an elastic member disposed between the second connecting member and the rotary member; and
   a limiting member;
   wherein a sidewall of one of the second pivot portion of the rotary member and the second connecting member defines a limiting structure,
   wherein the limiting structure comprises a ring-shaped limiting slot and a positioning slot communicating with the limiting slot; the limiting slot extends along a circumference of the second pivot portion of the rotary member or the second connecting member; the positioning slot extends along an axis parallel to the axis of the second pivot portion of the rotary member or the second connecting member, and
   wherein the limiting member is disposed on a sidewall of the other one of the second pivot portion of the rotary member and the second connecting member; the limiting member slidably engages with the limiting structure.

2. The hinge assembly of claim 1, wherein the limiting slot extends through an angle of 270 degrees, and the positioning slot is positioned to partition the limiting slot into two parts extending through 90 degrees and 180 degrees correspondingly.

3. The hinge assembly of claim 1, wherein the limiting member is a pin disposed on the rotary member or the second connecting member.

4. The hinge assembly of claim 3, wherein the first connecting member comprises a knuckle and a connecting portion, the knuckle extends and coils from an end of the connecting portion, and the knuckle defines an opening at a sidewall, thus having a C-shaped cross-section.

5. The hinge assembly of claim 4, further comprising an additional first connecting member, and the knuckles of the first connecting members coil along opposite directions on the rotary member.

6. The hinge assembly of claim 4, wherein the second connecting member comprises a connecting shaft and a housing formed from a side of the connecting shaft, the housing defines a cavity and includes a sidewall enclosing the cavity, the sidewall of the housing defines a pinhole communicating with the cavity; the limiting member is positioned in the pinhole; and the elastic member and the second pivot portion are received in the cavity.

7. The hinge assembly of claim 6, wherein the second pivot portion is formed substantially perpendicularly from the first pivot portion; and the first pivot portion and the second pivot portion are substantially cylindrical shafts.

8. The hinge assembly of claim 7, wherein the first pivot portion comprises a first shaft and two second shafts formed at opposite ends of the first shaft, the first shaft has a diameter larger than the second shafts; and the first connecting members are rotatably sleeved on the second shafts correspondingly.

9. The hinge assembly of claim 7, wherein the second pivot portion extends from a sidewall of the first shaft; the second pivot portion comprises a main shaft, and a guiding shaft, and the limiting structure is defined in the second pivot portion; the guiding shaft has a diameter smaller than the main shaft a step surface is defined at an interface between the main shaft and the guiding shaft; the elastic member resists the step surface and the housing; and a part of the elastic member is sleeved on the guiding shaft.

10. A hinge assembly, comprising:
    a first connecting member;
    a second connecting member;
    a rotary member pivotally connected to the first and second connecting members, the rotary member comprising a first pivot portion to engage with the first connecting member and a second pivot portion to engage with the second connecting member;
    an elastic member disposed between the second connecting member and the rotary member; and
    a limiting member;
    wherein a sidewall of one of the second pivot portion of the rotary member and the second connecting member defines a limiting structure having a curved resisting surface, wherein the limiting structure comprises a ring-shaped limiting slot and a positioning slot communicating with the limiting slot; the limiting slot extends along a circumference of the second pivot portion of the rotary member or the second connecting member; the positioning slot extends along an axis parallel to the axis of the second pivot portion of the rotary member or the second connecting member, and wherein the limiting member is disposed on a sidewall of the other one of the second pivot portion of the rotary member and the second connecting member; and the limiting member slidably resists the resisting surface under a force of the elastic member.

11. The hinge assembly of claim 10, wherein the limiting slot extends through an angle of 270 degrees, and the positioning slot is positioned to partition the limiting slot into two parts extending through 90 degrees and 180 degrees correspondingly.

12. The hinge assembly of claim 10, further comprising an additional first connecting member.

13. The hinge assembly of claim 12, wherein the second connecting member comprises a connecting shaft and a housing formed from a side of the connecting shaft, the housing defines a cavity and includes a sidewall enclosing the cavity, the sidewall of the housing defines a pinhole communicating with the cavity; the limiting member is positioned in the pinhole; and the elastic member and the second pivot portion are received in the cavity.

14. The hinge assembly of claim 13, wherein the first pivot portion comprises a first shaft and two second shafts formed at opposite ends of the first shaft, the first shaft has a diameter larger than the second shafts; and the first connecting members are rotatably sleeved on the second shafts correspondingly.

15. The hinge assembly of claim 14, wherein the second pivot portion extends from a sidewall of the first shaft; the second pivot portion comprises a main shaft, and a guiding shaft, and the limiting structure is defined in the second pivot portion; the guiding shaft has a diameter smaller than the main shaft; a step surface is defined at an interface between the main shaft and the guiding shaft; the elastic member resists the step surface and the housing; and a part of the elastic member is sleeved on the guiding shaft.

* * * * *

UNITED STATES PATENT AND TRADEMARK OFFICE
CERTIFICATE OF CORRECTION

PATENT NO. : 8,091,180 B2
APPLICATION NO. : 12/488726
DATED : January 10, 2012
INVENTOR(S) : Jin-Xin Wang, Lian-Cheng Huang and Li-Jun Yuan It is certified that error appears in the above-identified patent and that said Letters Patent is hereby corrected as shown below:

Title page item (73) "Assignees", should read as follows:

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW).

Signed and Sealed this
Twenty-ninth Day of May, 2012

David J. Kappos
*Director of the United States Patent and Trademark Office*